(12) United States Patent
Harrison (10) Patent No.: US 6,324,213 B1
(45) Date of Patent: Nov. 27, 2001

(54) ASSET TRACKING SYSTEM EMPLOYING REDUCED ORDER GPS WITH COMPRESSED GPS SATELLITE IDENTIFICATION DATA

(75) Inventor: Daniel David Harrison, Delanson, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/388,085

(22) Filed: Sep. 1, 1999

(51) Int. Cl.[7] ................................................ H04B 1/66
(52) U.S. Cl. .................... 375/240; 375/265; 375/340; 341/102; 341/103; 342/357; 342/358; 342/450
(58) Field of Search ..................... 375/240, 265, 375/340, 316; 342/357, 358, 450, 452; 341/102, 103

(56) References Cited

U.S. PATENT DOCUMENTS

| 4,507,752 | * | 3/1985 | McKenna et al. ............... 340/347 |
| 5,225,842 | | 7/1993 | Brown et al. ................... 342/357 |
| 5,708,681 | * | 1/1998 | Malkemes et al. .............. 375/297 |
| 5,752,218 | | 5/1998 | Harrison et al. ................ 701/207 |
| 5,909,513 | * | 6/1999 | Liang et al. .................... 382/253 |
| 6,075,470 | * | 6/2000 | Little et al. .................... 341/107 |

* cited by examiner

*Primary Examiner*—Stephen Chin
*Assistant Examiner*—Dac V. Ha
(74) *Attorney, Agent, or Firm*—Jill M. Breedlove; Christian G. Cabou (57) ABSTRACT

Satellite identification data generated when using the Reduced Order GPS (ROGPS) system are compressed, allowing for shorter data transmission times, reduced transmitter energy and reduced satellite channel occupancy. An indexed list of all possible constellations of a subset of all satellites is created. This list is then used at both the tracked object location and the central station to which the satellite identifications must be sent. At the tracked object location, the chosen satellite GPS indices are identified and the list index is found, encoded, and transmitted with only enough bits to uniquely identify it from all other indices in the list. At the central station, the received list index is used to find the satellite constellation corresponding to the chosen satellite GPS indices. The number of bits used to encode the index can be further reduced by reducing the indexed list size. This can be done at both the tracked object and the central station by using a priori knowledge to reduce the possible number of satellites from the full GPS set down to only those that could possibly be visible from the object to be tracked location at a given time.

8 Claims, 7 Drawing Sheets

ASSET TRACKING SYSTEM EMPLOYING REDUCED ORDER GPS WITH COMPRESSED GPS SATELLITE IDENTIFICATION DATA

TECHNICAL FIELD

This invention relates to a Global Positioning System (GPS) asset tracking system and, more particularly, to reducing GPS satellite identification data transmitted from tracked units in a GPS-based centralized asset tracking system.

BACKGROUND ART

The tracking and location of assets such as railcars, shipping or cargo containers, trucks, truck trailers, automobiles, etc., can be highly advantageous in commerce. Precise tracking of such vehicles and objects can facilitate their being efficiently allocated and positioned, and can provide for immediate, accurate localization of lost, delayed or damaged assets. The space-based global positioning system (GPS), implemented by the United States Department of Defense, constitutes a convenient instrumentality for determining geographical position in real time.

The GPS is a multiple-satellite-based radio-positioning system. Each GPS satellite transmits data to be used by a receiver to measure its distance from the GPS satellite. The signals from several satellites allow the receiver to compute its position, velocity and time parameters through known triangulation techniques. The signals provided by the GPS can be received globally and continuously.

The space segment consists of twenty-one operational satellites and three spare satellites. The satellites are positioned in orbits such that typically seven satellites, but a minimum of four, are observable at any time by a user anywhere on or near the earth's surface if the user has a clear view from the zenith to down near the horizon. Each satellite transmits signals on two frequencies known as L1 (1575.42 MHZ) and L2 (1227.6 MHZ), using direct-sequence spread spectrum techniques. A system with two tiers of position accuracy is provided by employing both C/A (coarse or clear/acquisition) and P (precise) spreading codes. Both C/A and P pseudo-random noise (PRN) codes are transmitted on frequency L1, and only the P code is transmitted on frequency L2. The C/A is available to any user, military or civilian, but the P code is usually encrypted (becoming Y code) and usable only by authorized military and civilian users. Both codes contain the timing information needed for determining the range from a satellite to the Superimposed on both the P and C/A codes is a 50 bit/second navigation (NAV) data stream that is unique for each satellite. Each NAV data stream is a continuous sequence of 30-second message frames, organized as a sequence of five 6-second sub-frames. Each sub-frame begins with a synchronization sequence called the telemetry-word preamble (TWP). This is followed by a hand-over word (HOW) that indicates GPS time at the beginning of the next sub-frame, and facilitates the transition from C/A to P code tracking. Each frame includes accurate ephemeris data that describes the satellite's position as a function of time, and clock-correction data for that satellite. Spread over twenty-five adjacent frames is the GPS almanac data for the entire set of GPS satellites. The almanac data includes approximate ephemeris data, satellite health status, coefficients for the ionospheric delay model for C/A code users, and coefficients used to calculate universal coordinated time (UCT).

The control segment comprises a master control station (MCS) and a number of monitor stations. The monitor stations track all GPS satellites, collecting ranging data and satellite clock data from each satellite. This information is passed on to the MCS where the satellite's future ephemeris and clock drift are predicted and, sometimes, corrected. The purpose of the control segment is to ensure that the information transmitted from the satellites is as accurate as possible.

The GPS is intended to be used in a wide variety of applications including space, air, sea and land vehicle navigation, precise positioning, time transfer, altitude referencing and surveying. A typical GPS receiver comprises a number of subsystems, including an antenna assembly, an RF (radio frequency) assembly, and a GPS processor assembly. The antenna assembly receives the L-band GPS signal and amplifies it prior to insertion into the RF assembly. A significant factor affecting accuracy of the computed position, velocity or time parameters is the relative positional geometry of the satellites selected for measurement of ranges. Generally, a best position solution is obtained using satellites having wide angles of separation. Considerable emphasis has therefore been placed on designing antenna systems to receive, with uniform gain, signals from any point on the hemisphere.

In a typical GPS receiver, the RF assembly mixes the L-band GPS signal down to a convenient IF (intermediate frequency) signal. Using various known techniques, the PRN code modulating the L-band signal is tracked through code-correlation at the receiver. This provides the processing gain needed to achieve a signal-to-noise ratio (SNR) sufficient for demodulating the navigation data. The Doppler shift of the received L-band signal is also measured through a carrier tracking loop. The code correlation and carrier tracking function can be performed using either analog or digital signal processing.

A typical GPS receiver receives and processes signals from several of the GPS satellites in order to determine range to (and relative velocity of) each satellite. With perfect knowledge of range to only three of the GPS satellites, exact receiver position can be determined from the intersection of the three "spheres" induced by the known satellite positions and the derived receiver ranges. With receiver noise and imperfect knowledge of satellite positions, the receiver-satellite ranges can only be estimated. Typically, errors from receiver noise are reduced by (effectively) averaging many range calculations. The pseudo range from a particular satellite is calculated by reading the transmission time (time stamp) associated with the sub-frame time marker in the satellite's data stream, subtracting this time from the reception time of the time marker (as indicated by the receiver time clock), and multiplying the difference by the speed of light. Error in the receiver clock leads to proportional pseudo-range errors. Because the same clock is used in receiving from all satellites, the same clock error is involved in all pseudo-range measurements. By measuring the pseudo-range from four or more satellites, the clock error (bias) and ranges can be jointly estimated.

At the receiver, the reception time of the time marker (or of any NAV data-bit edge) is determined by performing a cross-correlation of the received signal with a local replica of the known satellite PRN code, and noting the receiver time of the cross-correlation peak associated with the marker. The satellite signal structures use Code Division Multiple Access (CDMA) so that the above cross-correlation is part of the standard GPS receiver processing. A description of CDMA techniques may be found, for example, in *CDMA Principles of Spread Spectrum Communication*, by Andrew J. Viterbi, Addison-Wesley (1995).

A typical GPS receiver must determine its own position. This requires that the GPS time stamp, satellite ephemeris, and other NAV data be decoded from each satellite's data stream at the tracked object. The receiver is thus required to process data from each satellite long enough (between six and 150 seconds) to synchronize with, and decode, these data. This consumes significant energy.

U.S. Pat. No. 5,752,218, issued May 12, 1998 and assigned to the instant assignee, discloses a Reduced Order GPS (ROGPS) system that substantially reduces the energy requirements at tracked objects. This reduction is accomplished by deriving ROGPS data from the received GPS signals at the tracked object and sending these data to the central station for processing. The ROGPS data require less GPS receiver and processor operating time than does conventional GPS data reception; however, the ROGPS data set is larger than that generated by a normal GPS receiver, and hence more data must be communicated to the central station. This increases the communication channel occupancy and transmitter energy consumed.

One reason that the ROGPS data set is larger than that generated by a normal GPS receiver is that the ROGPS data set must include satellite identification data indicating the GPS satellite indices associated which each ROGPS measurement. It would be advantageous to have an improved ROGPS system that uses fewer data bits to communicate these indices to the central station.

SUMMARY OF THE INVENTION

A preferred embodiment of the invention includes a central station that obtains the receiver positions and can communicate with the receivers. Each tracked object (e.g., a railcar) carries a GPS-based receiver that processes the signal from several of the visible GPS satellites. However, normal GPS processing is not performed at the tracked object; instead, only partial processing is done at the tracked object and intermediate results are transmitted to the central station. The forms of both the partial processing and intermediate results are chosen to reduce the complexity and energy requirements at the tracked objects. By using ROGPS data and providing for compression of the GPS-satellite identification data, shorter tracked object data transmission times are achieved and both the transmitter energy and communication-satellite channel occupancy are reduced.

Also in a preferred embodiment of the invention, an indexed list of all possible subsets (constellations) of GPS satellites is created for a given subset size (number of GPS satellites). This list is then used at both the tracked object location and the central station to which the GPS satellite identifications must be sent. At the tracked object location, the chosen GPS satellite indices are identified and the list index is found. This index is encoded and transmitted with only enough bits to uniquely identify it from all other indices in the list. At the central station, the received list index is used to determine the particular subset of GPS satellites. The number of bits used to encode the index can be further reduced by using prior knowledge to limit the possible GPS satellite subsets to only those GPS satellites that could possibly be visible from the tracked object location at the given time.

PREFERRED EMBODIMENT OF THE INVENTION

Figure 1:
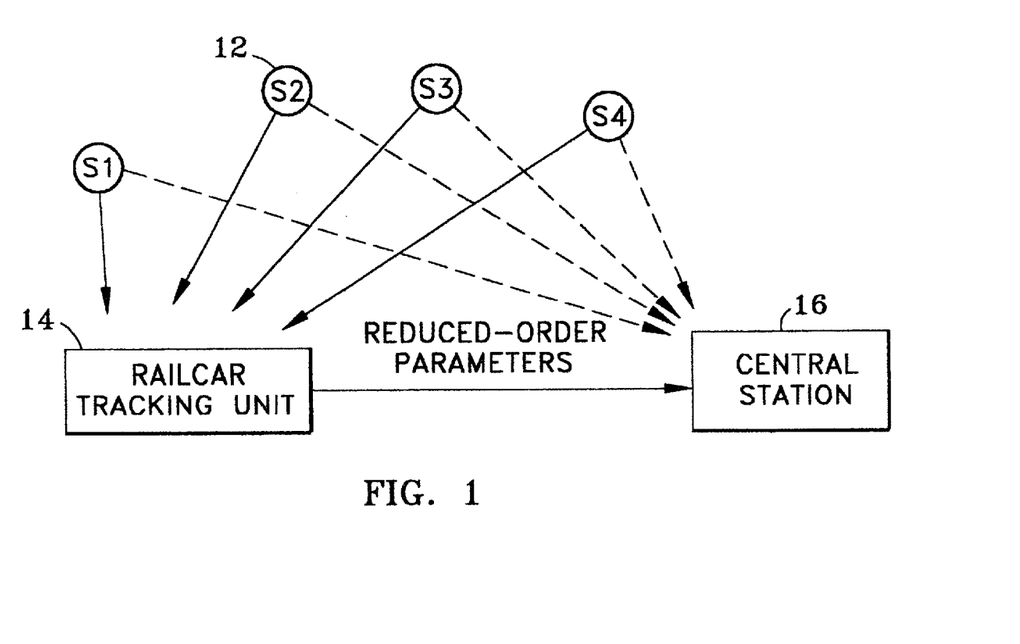
FIG. 1 is a block diagram of a remote tracking system in accordance with a preferred embodiment of the invention.

FIG. 1 shows a plurality of GPS satellites 12, an object (asset) being tracked, such as a rail car carrying a tracking unit 14, and a central station 16. Each satellite 12 transmits a signal that a GPS receiver in a tracking unit 14 uses to measure the propagation delay (and delay rate, if asset velocity is desired) from that satellite to the receiver antenna. The satellite signals also include the periodically repeating NAV data that are needed to determine a navigation solution from the measured time delays. Because of the low rate (50 b/s) of the NAV data in the GPS signal, a receiver must be active for a substantial period of time (approximately one minute) in order to collect the NAV data. Furthermore, the NAV data of a particular satellite changes over time and the GPS MCS monitors these changes and provides nearly hourly updates to the NAV data. To insure accurate navigation solutions, any GPS based navigation system must use NAV data that are no more than about four hours old. If the asset positions are to be monitored more frequently than every four hours, then new NAV data must be collected at least every four hours. NAV data maintenance then requires an approximate average of fifteen seconds of receiver operation per hour, which entails a significant energy expenditure if done at each tracked asset.

In accordance with one embodiment of the invention, the navigation solution is not calculated at the asset tracking unit but is instead calculated at the central station. None of the NAV data is needed at the tracked asset. At asset tracking unit 14, only data relating to the GPS signal propagation delay between each satellite and the asset need be measured, and these data are then sent to central station 16. In practicing the invention, the NAV data can be determined at central station 16 by utilizing a standard GPS receiver there, or by communicating with an appropriately located standard GPS receiver. If desired, the NAV data, or the navigation solution, could be communicated to the tracked assets via a higher rate communication link that would require less energy to receive at the asset. With no NAV data decoding needed at the asset, GPS signal acquisition becomes the main GPS processing task at the asset, and signal acquisition and data transmission become the dominant energy consuming tasks.

Figure 2:
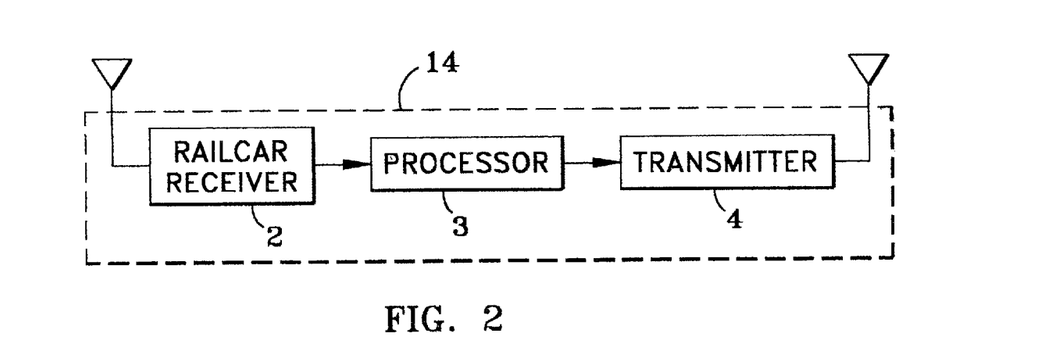
FIG. 2 is a block diagram of a tracking unit on an object to be tracked.

As shown in FIG. 2, a rail car tracking unit 14 is actually comprised of a receiver 2 responsive to the signals from GPS satellites 12 (FIG. 1), a processor 3, and a transmitter 4. The received signals are processed by processor 3 to ascertain and utilize propagation time differences among the signals received from the GPS satellites. By utilizing time differences, the need for knowledge of the GPS signal time-stamps at the asset is alleviated, and data stream decoding is therefore unnecessary at the asset. With no need for GPS data stream decoding, the tracking unit operation reduces to acquisition of the GPS signals, calculation of the relevant time differences (and Doppler frequency differences, if asset velocities are to be determined) from the acquisition results, and transmitting to central station 16 the calculated time differences and data identifying the satellites associated with the differences. A description of the centralized tracking system in which GPS signal acquisition is a major part of the assets' GPS energy budget is found in U.S. Pat. No. 5,752,218, referenced above.

The GPS satellite identification index associated with any received GPS signal is readily determined at the receiver by noting which unique pre-assigned PRN code (e.g., C/A code) is included in the received signal. This is performed as part of the normal GPS receiver process, and is also readily performed as part of the ROGPS measurement process.

A conventional method for communicating satellite identification indices to the central station would be to use enough bits for each satellite index so as to unambiguously determine it from the 24 possibilities. With twenty-four possible satellites, five bits would be needed to specify any satellite index because $2^4<24<2^5$. If K satellites need to be identified then the number of bits required would be $$B=5K. \quad (1)$$

According to a preferred embodiment of the invention, an index list of all possible constellations of K satellites (that can be formed from the 24 GPS satellites) is created. By constellation, what is meant is a particular set of GPS satellite indices. This constellation list is then used at both the object (i.e., asset or railcar) location and at the central station to which the satellite identifications must be sent. At the tracked object location, the chosen satellite GPS indices are identified and the list index (in the common list) is found. This index is then encoded and transmitted with only enough bits to uniquely identify it from all other indices in the list. At the central station, the received list index is decoded to determine the particular satellite constellation.

The number of distinct K-satellite constellations that can be selected from N satellites is given by $$L = \frac{N!}{K!(N-K)!}, \quad (2)$$

where the "order" of the GPS satellite indices in the subset is irrelevant. This L is then the size of the constellation list. The number of bits needed to specify one of L indices is given by $$B=\log_2 L, \quad (3)$$

where B is always rounded up to the nearest integer. As an example, with N-24 and K=4, equation (2) reveals that there are L=10626 ways to select the satellites. From equation (3), a particular constellation can be uniquely encoded with 14 bits. The normal method of equation (1) would require 20 bits.

The above method can be used to separately encode several constellations, from different measurement epochs, into one report. The number of bits required is just the sum of the bits needed for each constellation. The method can also be extended to simultaneously encode the several constellations. Let M be the number of measurement epochs for which the constellations are to be communicated, and let m be an index for those epochs. Next, let $K_m$ be the number of satellites in the $m^{th}$ constellation, and let $N_m$ be the number of possible constellations for epoch m. Assume that each $K_m$ and $N_m$ are known by the central station from a pre-arranged message format. With M constellations in a report, the number of possible joint satellite constellations across the report is given by $$L_R = \prod_{m=1}^{M} L_m = L_1 \cdot L_2 \cdot L_3 \cdots L_M, \quad (4)$$

where each $L_m$ in equation (4) can be found from equation (2) by replacing N and K with $N_m$ and $K_m$, respectively. The number of bits needed to specify the M constellations is then found using $L_R$ in equation (3). This number is never greater than the sum of the bits needed if each constellation were separately encoded, and is often smaller. For example, if M=4 constellations are encoded together in a single report, each constellation having $K_m$=4 and $N_m$=24, then equations (2) to (4) yield the number of satellite identification bits for a report as $B_R$=54 bits. This is less than the 4×14=56 bits needed for separate encoding.

With the ROGPS (see U.S. Pat. No. 5,752,218), other measurement data are also derived from the GPS satellite signals, and these data must be communicated to the central station while maintaining its association with particular GPS satellite indices. This can be accomplished by deciding, a priori, that the GPS satellite indices in each constellation will always be ordered from lowest GPS index to highest, with the lowest first. Any corresponding measurement data would then be ordered in the same way in any communicated message. In this way, the association of measurements with GPS satellite indices can be known at the central station. Furthermore, multiple constellations and associated measurement sets can be communicated in a single message to the central station by ordering the constellations and associated measurements from oldest to newest, with oldest set first. With a fixed-ordering method like this, no communication data bits are needed to determine the data-satellite index association.

Figure 3:
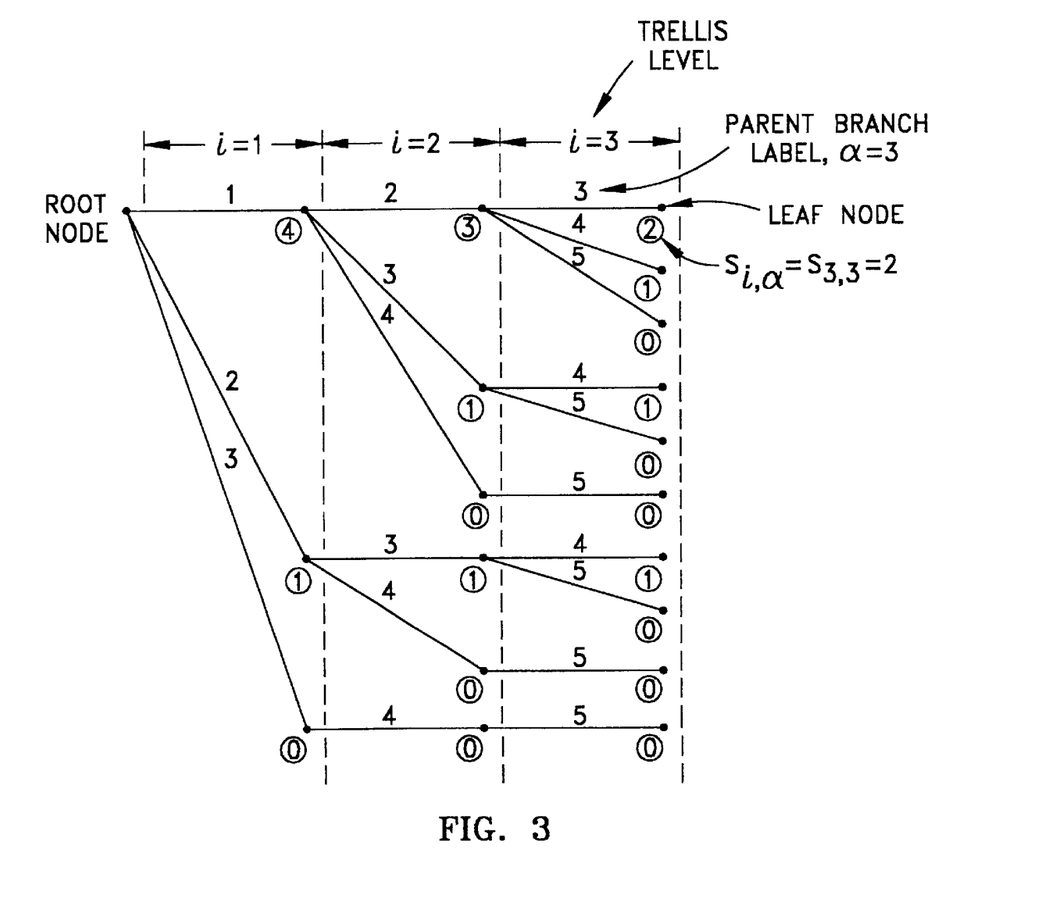
FIG. 3 is a diagram illustrating a satellite constellation encoding tree used in a preferred embodiment of the invention.

To encode the GPS indices for a specific constellation, first let $G=(G_1,G_2, \ldots ,G_K)$ be the constellation of GPS indices for the GPS satellite signals used at the asset to be tracked, where the indices are ordered so that $G_1<G_2< \ldots <G_K$. At the asset to be tracked, the encoder takes the ordered elements of G and generates a list index I that is uniquely associated with the particular constellation G. The index I is transmitted to the central station. The encoding process can be accomplished with an encoding tree, as shown in FIG. 3, for the situation where N=5 available satellites and K=3 satellites in a constellation. The tree is comprised of a root (starting) node, L leaf nodes, and K node levels, one level for each element (satellite) in G. Each level can have many nodes, and each node is connected to its parent node at the previous level (to the left) by a branch labeled with a particular GPS satellite index. A parent node can have many children, and a node and its branch from the parent are considered to be at the same level.

To determine the list index I, the tree is traversed from left to right, starting at the root node and ending at a leaf node at level K. A node at the level 1 is reached by moving from the root node (level 0) to the child node on the branch labeled with GPS index $\alpha = G_1$. Similarly, the node at level i is reached by moving from the parent node at level i-1, along the branch labeled with GPS index $\alpha = G_i$, to the child node at level i. A node path is uniquely identified by the sequence of branch labels encountered in moving along the path from the root to that node. The GPS indices in any constellation are all different so that no branch label is repeated in a single path.

A simple memory efficient constellation encoding method is made possible with the node tree by ordering the GPS indices from any constellation G so that the GPS indices (branch labels) along any tree path monotonically increase [decrease] with tree level. Associated with each tree node are two values, $D_{i,\alpha}$ and $S_{i,\alpha}$. Here $i \in \{1,2,\ldots,K\}$ is the node level in the tree and $\alpha \in \{1,2,\ldots,N-(K-i)\}$ is the node's parent branch label. Value $D_{i,\alpha}$ is the integer number of leaf nodes at level K that are descendant from the given node. Value $S_{i,\alpha}$ is the integer number of leaf nodes at level K that are descendant from any of the given node's siblings whose parent branch label is larger [smaller] than the parent branch label for the given node. For any given node, a sibling node is one that has the same parent node as the given node. The value $D_{i,\alpha}$ is given by $$D_{i,\alpha} = \frac{(N-\alpha)!}{(K-i)!(N-\alpha-(K-1))!} \quad (5)$$

and is the number of level-K descendants. For the tree with branch labels increasing along each path, the value $S_{i,\alpha}$ is given by $$S_{i,\alpha} = \sum_{m=\alpha+1}^{N-(K-i)} D_{i,m}, \quad (6)$$

and is the sum of all level-k descendants of all higher-labeled siblings of the given node. Since the highest GPS index is N, all tree branches at level i must have labels that satisfy $\alpha < N-(K-i)$. A sum similar to equation (6) can also be determined for a tree with branch labels that decrease along each path.

Figure 4:
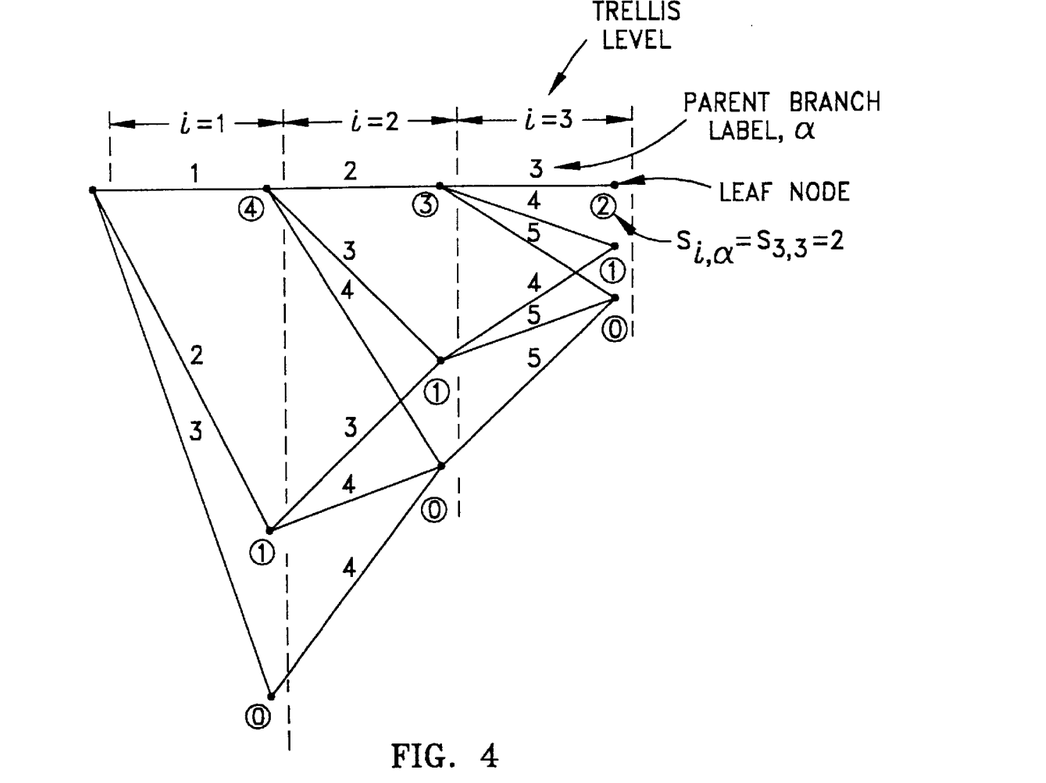
FIG. 4 is a diagram showing the encoding tree of FIG. 3 folded into a trellis.

By ordering the tree branch labels on each path to be monotonically increasing (or decreasing) with increasing tree level, a repetitive structure is induced in the node tree that allows it to be folded into a trellis. All tree nodes that are at the same level and have the same parent branch label also have the same values of $D_{i,\alpha}$ and the same values of $S_{i,\alpha}$. This allows the folding of the tree into a trellis. FIG. 4 shows the tree of FIG. 3 folded into such a trellis. The trellis has many fewer nodes than the tree and thus has a much smaller representation in any computer.

The constellation index I that is provided from the encoder for a particular input constellation $G=(G_1,\ldots,G_K)$, is given by $$I = \sum_{i=1}^{K} S_{i,G_1}. \quad (7)$$

For a given N and K, the values $D_{i,\alpha}$ and $S_{i,\alpha}$ can be calculated a priori for all trellis nodes and stored in memory that is addressed only by the pair $(i,\alpha)=$(trellis level, parent-branch label). Then, as a particular G path is followed in the trellis during constellation encoding, the $S_{i,\alpha}$ value associated with each node in the path is recalled and accumulated to form the constellation index. In FIG. 4, the $S_{i,\alpha}$ values lie just below each trellis node. The values $D_{i,\alpha}$ are not needed during constellation encoding, and are used only to reduce the effort in calculating the $S_{i,\alpha}$ values a priori. An advantage of this encoding method is that the number of $S_{i,\alpha}$ values that must be stored in encoder memory is always less than N×K because it is always true that $i \leq K$ and $G_i \leq N$ so that the number of trellis nodes is never greater than N×K. For example, with realistic GPS parameters such as N-24 and K=4, the trellis encoder memory must store no more than 96 values.

Figure 5:
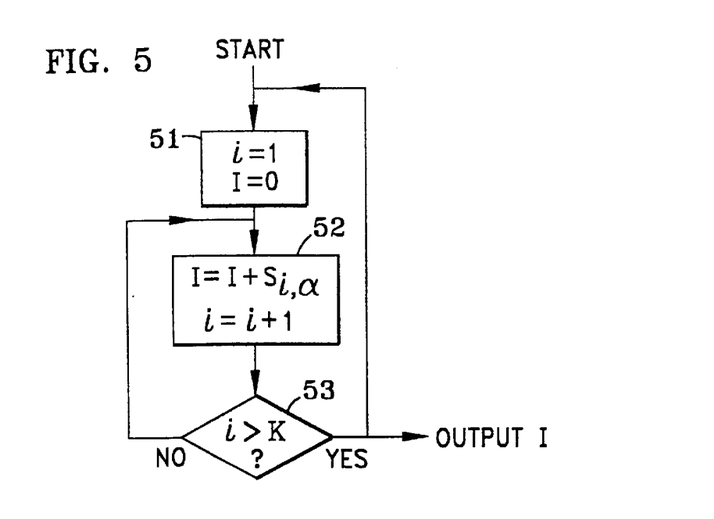
FIG. 5 is a flow diagram showing the logic of a software implementation for calculating the constellation index I of a constellation encoder employed in accordance with a preferred embodiment of the invention.

A flow diagram for calculating constellation index I from a constellation $G=(G_1,G_2,\ldots,G_K)$ is shown in FIG. 5. The process begins by setting I to 0 and i to 1 at step 51. Then the process enters a loop at the beginning of which, at step 52, the present value of I is increased by $S_{i,G_i}$, where $a=G_i$. Then the present value of i is incremented by one. A test is then made at step 53 to determine if i is greater than K. If i is not greater than K, the process loops back to step 52; otherwise, I is provided as an output signal and the process loops back to step 51 to await processing of another constellation.

Figure 6:
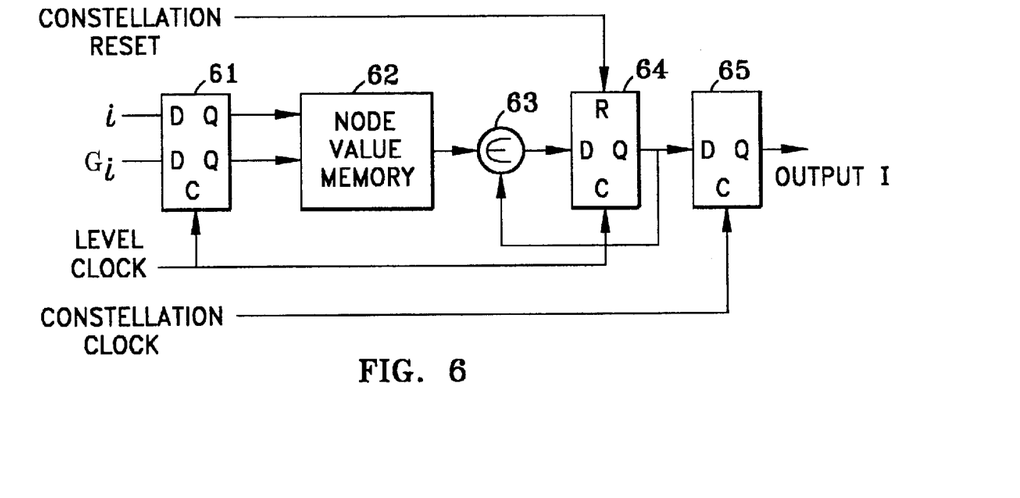
FIG. 6 is a block diagram showing a logic implementation of the constellation encoder employed in accordance with a preferred embodiment of the invention.

This process can be readily implemented by one skilled in the art using either a general purpose processor or dedicated logic. An example of a dedicated logic implementation block diagram is shown in FIG. 6, where i and $G_i$ values are supplied to a latch 61 and latched with each level-clock cycle. The latched output signals of latch 61 are used to address a node value memory 62 which supplies an output signal $S_{i,G_i}$ to a summer 63. The output signal of summer 63 is supplied to a latch 64 which latches its input signal on every level-clock cycle. The output signal of latch 64 is fed back to summer 63 for accumulation with the next node memory 62 output signal during the next level-clock cycle. Latch 64 is reset at the beginning of each constellation encoding cycle by the constellation clock. Output signals of latch 64 are also provided to a latch 65, which is clocked by the constellation clock. The output signal of latch 65 is the list index I.

At the central station 16 (FIG. 1), a received constellation-list index I is converted back into its associated sequence of GPS indices G by a constellation decoder. The decoder uses a decoding trellis that is similar to the encoder trellis except that the values associated with the decoder trellis nodes are slightly different. For the trellis with branch labels increasing with level, the node values are given by $$\beta_{i,\alpha} = \sum_{m=\alpha}^{N-(K-i)} D_{i,m} = S_{i,\alpha} + D_{i,\alpha}. \quad (8)$$

Figure 7:
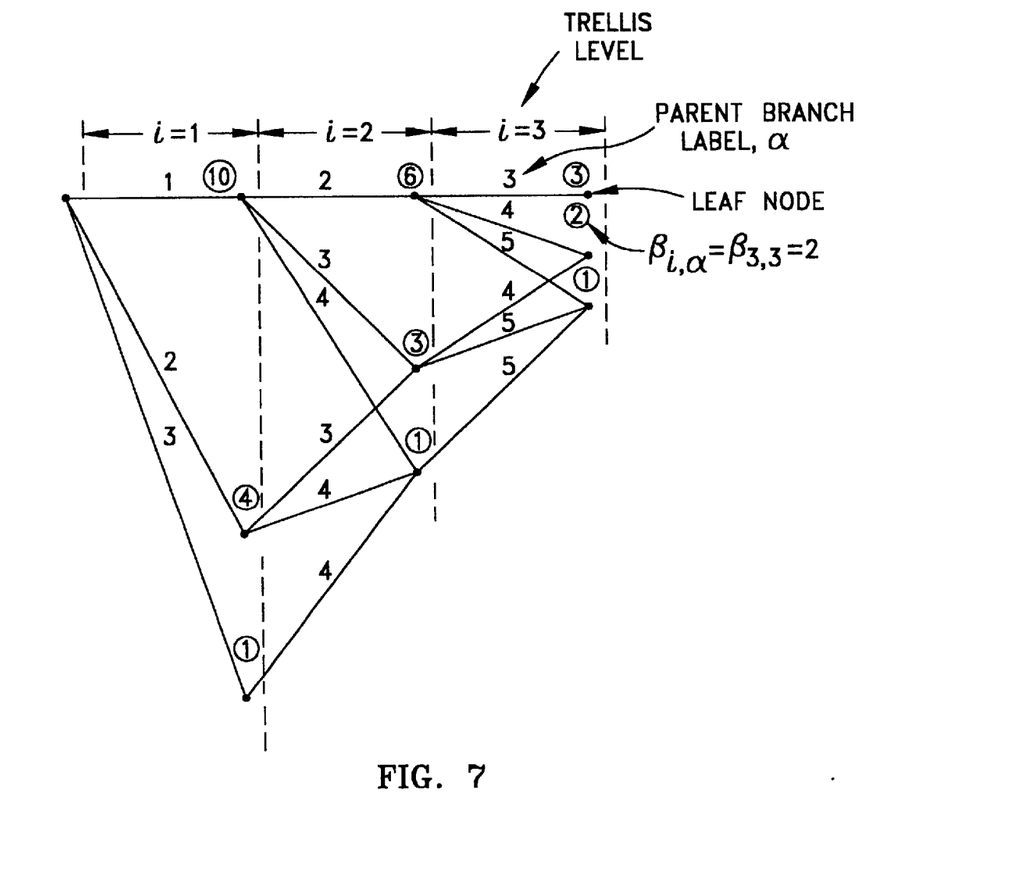
FIG. 7 is a diagram illustrating a satellite constellation decoding trellis according to a preferred embodiment of the invention.

As with the encoding tree, i is the tree level and indicates which element of G is presently being decoded and $\alpha$ is the parent branch label associated with the present node. Equation (8) is the same as equation (6) except that $D_{i,\alpha}$ has been added to each $S_{i,\alpha}$. Thus the value associated with any node is the number of leaf nodes at level K that are descendant from that node, plus the number of leaf nodes at level K that are descendant from any of that node's siblings that have a higher valued parent branch label. FIG. 7 illustrates the decoding trellis associated with the encoding trellis of FIG. 4.

Figure 8:
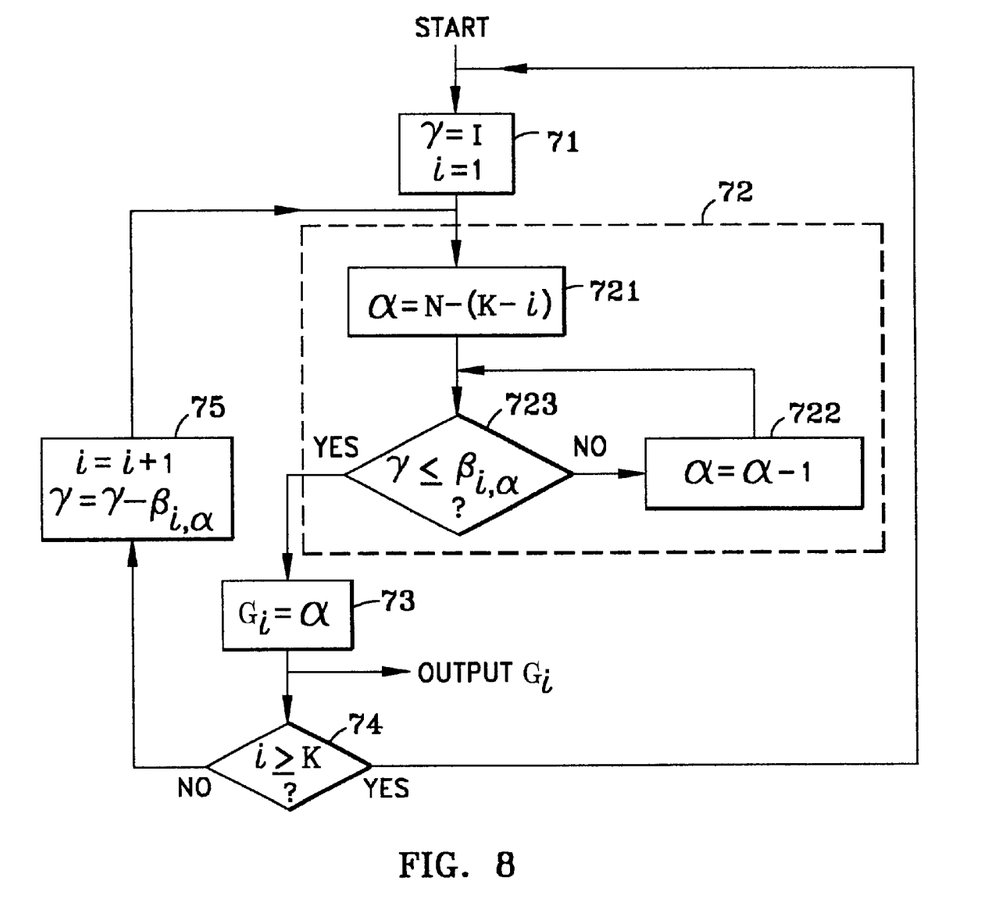
FIG. 8 is a flow diagram showing the logic of a software implementation, starting with a given list index I, of the constellation decoder according to a preferred embodiment of the invention.

Operation of the decoder is illustrated with the flow diagram of FIG. 8 and with reference to the trellis of FIG. 7. Starting with a given list index I at step 71, the trellis level count i is initialized to i=1 and the constellation index remainder $\gamma$ is initialized to I. Next, at step 72 and for any level i, the nodes at level i are examined to determine which node has the parent branch label $\alpha$ that satisfies $$\beta_{i,\alpha-1} < \gamma \leq \beta_{i,\alpha}. \tag{9}$$

For any level i in the trellis of FIG. 7, the value $\beta_{i,\alpha}$ is strictly monotonically increasing with decreasing $\alpha$. This is a quantization problem with solution methods that are well known to those skilled in the art. One simple method for solving equation (9) is to examine all nodes in the level, starting with the node with the largest parent branch label ($\alpha$=N-(K-i)) at step 721, decrementing $\alpha$ by one after each node is examined at step 722, and stopping at the first node where the parent branch label $\alpha$ satisfies $\gamma \leq \beta_{i,\alpha}$ at step 723. This value of a is then the solution to equation (9). This is here called a sequential-scan quantizer. A binary-search quantizer is an alternative solution method for equation (9) that has speed advantages for large trellises.

After the solution $\alpha$ to equation (9) has been found at step 72, $G_i$ is set equal to $\alpha$ at step 73. Next, at step 74, the present trellis level is tested to see if it is the final level. If it is not the final level, then level i is incremented and $\gamma$ is updated as $\gamma=\gamma-\beta_{i,\alpha}$ at step 75. The process then loops back to step 72. If the final level has been reached, then all K satellite indices, $G_1, G_2, \ldots G_K$, have been determined and the decoder stops and waits for another constellation list index.

Figure 9:
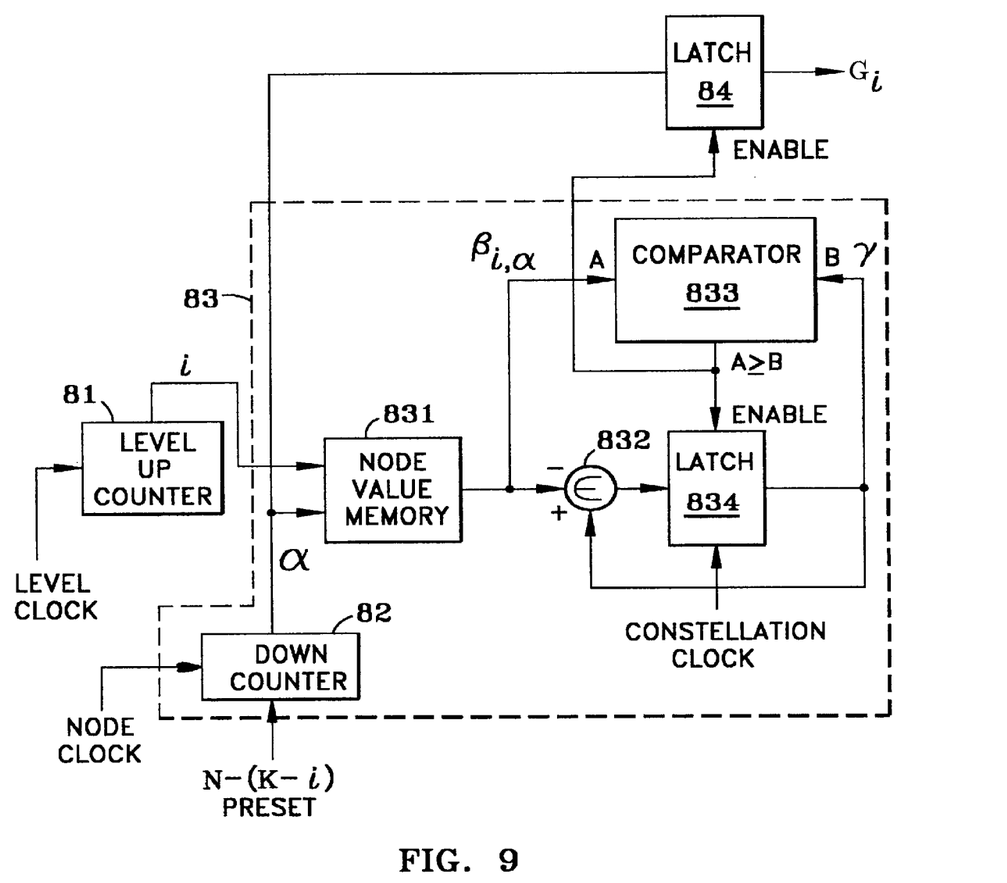
FIG. 9 is a block diagram showing a logic implementation of the constellation decoder according to a preferred embodiment of the invention.

As with the encoder, the decoder process is readily implemented by one skilled in the art, using either a general purpose processor or dedicated logic. A block diagram for a dedicated logic implementation corresponding to the decoder trellis of FIG. 7 is shown in FIG. 9. For brevity in FIG. 9, details for various counter presets and logic synchronization are not shown as these are readily determined by one skilled in the art. The decoder implementation in FIG. 9 uses the sequential-scan quantizer for solving equation (9), but other quantizers could be used. At the beginning of a constellation decoding cycle, the constellation list index I is stored in latch 834. Trellis level i is supplied from an up counter 81 and $\alpha$ is supplied from a down counter 82 to a decoder 83. The values i,$\alpha$ are used to address a node value memory 831 which supplies node values $\beta_{i,\alpha}$ to a subtractor 832 and a comparator 833. The output signal of summer 832 is latched in a latch 834 as constellation index remainder $\gamma$ and fed back to summer 832 to update $\gamma$ for the next cycle. The output signal of latch 834 is also supplied to comparator 833 which generates an output signal when $\gamma \leq \beta_{i,\alpha}$. This output signal is used to enable a latch 84 to sample the output signal of down counter 82. By the end of the decoding cycle, the decoder has produced the sequence of GPS satellite indices $G_i$ (parent-branch labels) as an output signal.

Three time grids (clocks) associated with the decoder are 1) a constellation clock, 2) a trellis level clock, and 3) a sibling-search or node clock. A new constellation index is decoded every constellation clock cycle and one satellite index is decoded every trellis level clock cycle. The sibling-search clock is used by the sequential-scan quantizer to sequentially scan through the trellis nodes at a given level.

In FIG. 9, latch 834 holds the current value of $\gamma$ and the trellis level counter 81 holds the present value of the trellis level i. At the beginning of the decoding cycle, $\gamma$ is preset to constellation list index, I, and i is preset to i=1. Node-value memory 831, comparator 833, and sibling down-counter 82 comprise the sequential-scan quantizer. During the decoder cycle, trellis level counter 81 increments i, one count at a time, from 1 to the number of trellis levels K. For each value of i in counter 81, sibling counter 82 is first preset to an initial value of $\alpha$=N-(K-i), and then decremented one count at a time until $\gamma \leq \beta_{i,\alpha}$ is true. For each such value of $\alpha$, node-value memory 831 is addressed by the pair (i,$\alpha$) and generates output signal $\beta_{i,\alpha}$. This value $\beta_{i,\alpha}$ is compared to the present value of $\gamma$ by comparator 833. During the comparison, subtractor 832 subtracts $\beta_{i,\alpha}$ from the present value of $\gamma$, creating an output signal $\gamma-\beta_{i,\alpha}$. If comparator 833 detects that $\gamma \leq \beta_{i,\alpha}$ is true, then decrementing of counter 82 is terminated, $\gamma-\beta_{i,\alpha}$ is latched by latch 834 as the new value for $\gamma$, and a is latched by latch 84 as output signal $G_i$ for trellis level i.

The constellation encoding and decoding methods described above can be combined with a multiple-constellation encoder and decoder to jointly encode and jointly decode the satellite constellations from M measurement epochs and achieve further data compression. In what follows, the M constellations are indexed by m, the total number of satellites available for use in constellation m is $N_m$, and the number of satellites used in constellation m is $K_m$. Each constellation is first separately encoded to generate a constellation list index $I_m$, using the method of FIG. 4. The set of constellation indices is then further encoded as described below to yield the final output index $I_R$ It is assumed that M, $N_m$, and $K_m$ are either predetermined and known at both the encoder and decoder, or that they are somehow communicated separately for use by the decoder.

The number of ways to choose a sequence of M constellations was given by equation (4) as $$L_R = \prod_{m=1}^{M} L_m = L_1 \cdot L_2 \cdot L_3 \cdots L_{M'}. \tag{10}$$

An efficient method for encoding a given sequence of M constellations is to enumerate all $L_R$ possibilities and identify the one index associated with the given multiple-constellation sequence. The largest index in the enumerated list will be smallest (and thus require the fewest communication bits) if each index is calculated as $$I_R = I_M(L_{M-1} L_{M-2} \ldots L_1) + I_{M-1}(L_{M-2} L_{M-3} \ldots L_1) + \ldots + I_2 L_1 + I_1, \tag{11}$$

where $I_j \in \{0,1,2, \ldots L_j-1\}$. Equation (11) can be rewritten as $$I_R = \sum_{m=1}^{M} I_m \alpha_m, \tag{12a}$$

where $$\alpha_m = \prod_{j=1}^{m-1} L_j \text{ for } m = 2, 3, \ldots, M, \tag{12b}$$

This more compact formulation is most useful in describing the decoder operation. Equation (12) is similar to an M-digit number with $I_M$ as the most-significant digit (msd) and $I_1$ as the least-significant digit (lsd), but with the counting base of the $I^{th}$ digit given by $\alpha_j$.

At the central station, the multiple-constellation index $I_R$ is received and decoded to the original sequence of constellation indices, $I_1, I_2, \ldots I_M$. Then each of the constellation indices is decoded to its original set of satellite indices using the method of FIG. 8. The sequence of constellation indices is decoded from $I_R$ by first decoding $I_M$, then decoding $I_{M-1}$ then decoding $I_{M-2}$, etc, until finally decoding $I_1$. The decoding is recursive, with constellation index $I_M$ being found using $$I_M = int\left(\frac{I_R}{\alpha_M}\right), \tag{13a}$$

and then the remaining constellation indices being found using $$I_j = int\left(\frac{\left[I_R - \sum_{m=j+1}^{M} \alpha_m I_m\right]}{\alpha_j}\right), \tag{13b}$$

for $j = M-1, M-2, \ldots 1$. Here $\alpha_j$ is given by equation (12b) and int() means to take the integer part of the value in parentheses.

Figure 10:
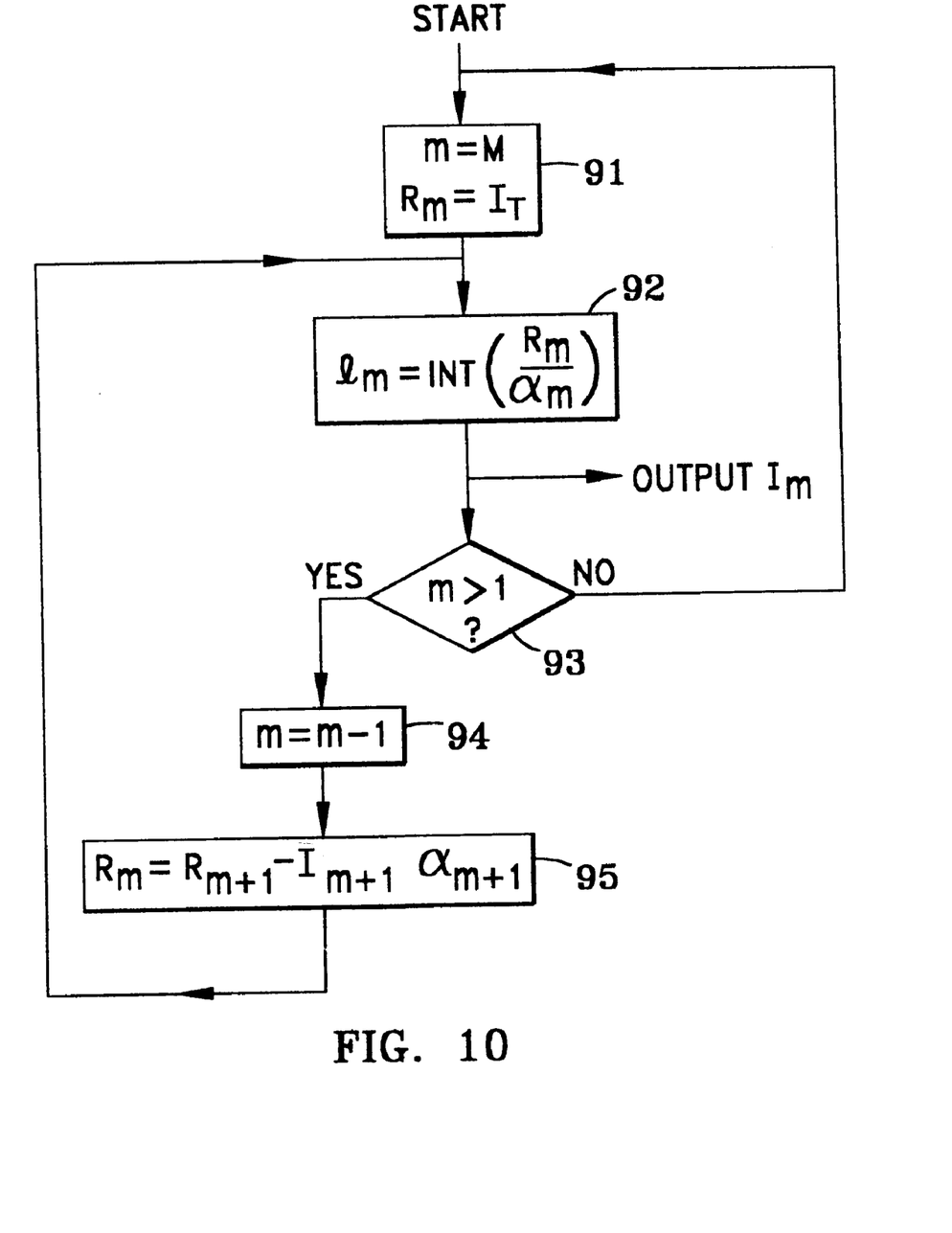
FIG. 10 is a flow diagram showing the logic of a software implementation for extracting separate constellation list indices from a joint list index according to a modification of the invention.

A flow diagram illustrating operation of the multiple-constellation decoder is shown in FIG. 10. The operation starts at step 91 by initializing m to M and initializing the remainder, $R_m$, to $I_R$. Then, at step 92, constellation list index $I_m$ is calculated by taking the integer part of $(R_m/\alpha_m)$. The constellation list index is then furnished as an output signal and m is tested at step 93 to determine if it is greater than 1 and, if yes, then m is reduced by 1 at step 94, a new remainder value $R_m$ is calculated at step 95, and the process loops back to step 92. If the result at decision step 93 is no, then constellation index $I_1$ is processed as an output signal and the process is terminated (i.e., the process loops back to step 91 to wait for another multiple-constellation index to decode).

After each pass through the flow chart loop, another constellation list index $I_m$ is decoded from $I_R$ and produced as an output signal at step 92. The GPS indices for that $I_m$ are then decoded using the process described by FIG. 8. The process of FIG. 10 is readily implemented by one skilled in the art.

A second method for reducing the number of satellite identification bits is to use the first method just described, but to reduce the size of the indexed list. This can be done at both the tracked object and at the central station by using prior knowledge to reduce the possible number of satellites from the full GPS set of twenty-four down to only those that could possibly be visible from the tracked object location at the given time. For the GPS system and points in North America, this number is usually about eight for satellites that are at least 10° above the horizon. For the previous example and a single constellation with K=4, N is reduced from twenty-four to eight. Equations (2) and (3) then yield L=70 and B=7 bits. This is substantially reduced from the original 20 bits.

Again, further reduction is achieved when multiple constellations are encoded in a single message. With four constellations, each with $K_i=4$ and $N_i=8$, equations (2) to (4) yield B=25 bits. This is less than 4×7=28 bits with separate encoding, and much less than 4×20=80 bits using the conventional method.

The identities of the particular N (e.g., 8) potentially visible satellites can be known at both the center and tracked object without any extra data transmission. Satellite visibility is readily predicted if the satellite ephemerides, the present time, and the present tracked object position are known. Actually, for communication purposes, all that is required is that the center and tracked object agree on which satellites are candidates. They do not all have to be visible. To insure that the tracked object and center candidate satellite lists are identical, each forms its list from the same algorithm, based on identical ephemerides, time, and tracked object position data. In fact, these data do not have to be correct; they just have to be the same at both locations if the candidate satellite lists are to be identical.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method to compress a monotonic sequence of K integers chosen from a monotonic sequence of N integers, where N≧K, the method comprising the steps of:

establishing a 1 to 1 correspondence between each possible monotonic K-integer sequence and an associated unique list index;

encoding the chosen K-integer sequence by determining the associated list index for said chosen K-integer sequence and representing said chosen K-integer sequence by the determined list index; and defining the determined list index by an encoding tree, the encoding tree having a root node, branches, and L leaf nodes, where L=

$$\frac{N!}{K!(N-K)!},$$

the L leaf nodes being connected to the root node via K node levels exclusive of the root node level, each node being connected to a parent node at a previous level by a parent branch, and wherein root to leaf node branches follow paths uniquely identifying the chosen K-integer sequence by the uniquely associated list index therefor.

2. The method according to claim 1 wherein the unique association of the chosen K-integer sequence and the associated list index therefor is determined by:

labeling each parent branch at a level i with a number $S_{i,\alpha}$; and summing the number $S_{i,\alpha}$ along the K-integer sequence path to yield the list index.

3. The method according to claim 2 wherein the tree is folded into a trellis.

4. The method according to claim 1 wherein multiple sequences of integers are encoded in accordance with said encoding tree.

5. The method according to claim 1 wherein the integers comprise Global Position System (GPS) satellite indices.

6. A method of compressing satellite identification data generated when using the Global Positioning System (GPS) in a remote tracking application, comprising the steps of:

creating an indexed list of all possible constellations of a subset of all satellites of the GPS;

supplying the indexed list to a tracked object and a central station;

receiving at said tracked object signals transmitted from a plurality of satellites in the GPS;

identifying at the tracked object the indices of said plurality of satellites;

encoding the GPS satellite indices into a list index, the list index being defined by an encoding tree; the encoding tree having a root node, branches, and L leaf nodes, where L=

$$\frac{N!}{K!(N-K)!},$$

the L leaf nodes being connected to the root node via K node levels exclusive of the root node level, each node being connected to a parent node at a previous level by a parent branch, and wherein root to leaf node branches follow paths uniquely identifying the chosen K-integer sequence by the uniquely associated list index therefor;

transmitting said list index to said central station; and decoding the list index into the GPS satellite indices at the central station.

7. The method of compressing satellite identification data of claim 6, including the further steps of:

measuring data related to propagation time differences between signals transmitted from a plurality of satellites in the GPS and received at said tracked object;

transmitting the measured data to the central station; and calculating at the central station the location of said tracked object based on the measured data and the decoded GPS satellite indices.

8. The method according to claim 6 wherein the step of encoding the identified subset is performed jointly for multiple constellations of satellites in the GPS system.

* * * * *